US008401677B2

(12) United States Patent
Landgraf

(10) Patent No.: US 8,401,677 B2
(45) Date of Patent: Mar. 19, 2013

(54) METHOD FOR PROGRAMMING A CONTROL DEVICE

(75) Inventor: Guenther Landgraf, Karlstadt (DE)

(73) Assignee: Robert Bosch GmbH, Stuttgart (DE)

( * ) Notice: Subject to any disclaimer, the term of this patent is extended or adjusted under 35 U.S.C. 154(b) by 486 days.

(21) Appl. No.: 12/361,585

(22) Filed: Jan. 29, 2009

(65) Prior Publication Data

US 2009/0198352 A1 Aug. 6, 2009

(30) Foreign Application Priority Data

Feb. 1, 2008 (DE) .................. 10 2008 007 102

(51) Int. Cl.
*G05B 15/00* (2006.01)
*G05B 19/42* (2006.01)
*G05B 11/01* (2006.01)
*G06F 9/44* (2006.01)
*G06F 9/445* (2006.01)
*G06F 3/00* (2006.01)
*G06F 9/46* (2006.01)
*G06F 13/00* (2006.01)

(52) U.S. Cl. .............. 700/83; 700/18; 700/86; 717/173; 717/178; 719/311; 719/320

(58) Field of Classification Search ............ 700/11, 700/19, 83, 86, 87, 17, 18; 709/201–203, 709/217–220, 221; 717/100–103, 168, 171–174, 717/176–178; 719/310, 311, 319, 320; 455/418–420
See application file for complete search history.

(56) References Cited

U.S. PATENT DOCUMENTS

| | | | | |
|---|---|---|---|---|
| 5,225,975 | A * | 7/1993 | Gates et al. ..................... | 700/18 |
| 5,349,518 | A * | 9/1994 | Zifferer et al. .................. | 700/87 |
| 6,192,215 | B1 * | 2/2001 | Wang ........................ | 434/307 R |
| 6,268,853 | B1 * | 7/2001 | Hoskins et al. ................. | 700/83 |
| 6,272,398 | B1 * | 8/2001 | Osborne et al. .............. | 700/245 |
| 6,441,291 | B2 * | 8/2002 | Hasegawa et al. ............. | 84/609 |
| 6,757,568 | B2 | 6/2004 | Birzer et al. | |
| 6,850,973 | B1 * | 2/2005 | Larson et al. ................. | 709/221 |
| 7,113,837 | B2 * | 9/2006 | Takemoto et al. ............. | 700/87 |
| 7,203,560 | B1 * | 4/2007 | Wylie et al. .................. | 700/110 |
| 7,231,398 | B2 * | 6/2007 | Schlereth et al. ..................... | 1/1 |
| 7,284,132 | B2 * | 10/2007 | Nakabe et al. ................ | 713/182 |
| 7,562,128 | B1 * | 7/2009 | Caris et al. ................... | 709/220 |
| 7,603,289 | B2 * | 10/2009 | Kriedler et al. .............. | 705/7.35 |

(Continued)

FOREIGN PATENT DOCUMENTS

| | | |
|---|---|---|
| EP | 1 221 638 | 7/2002 |
| EP | 1 380 908 | 1/2004 |

OTHER PUBLICATIONS

Robert W. Brennan: "Toward Real-Time Distributed . . . " IEEE Transactions on Systems, Man, and Cybernetics—Part C: Applications and Reviews, vol. 37, No. 5, Sep. 2007 (In Eng.).

*Primary Examiner* — Crystal J Barnes-Bullock
(74) *Attorney, Agent, or Firm* — Michael J. Striker

(57) ABSTRACT

A method for programming a control device for a machine includes the steps of obtaining a component that is required to program the control device, this component being called up from a data collection, storing the component in a memory device, processing the component, integrating the processed component in the control device, calling up the component from a data collection via an Internet, outputting instructions that are characteristic for the components and for integrating the components in the control device, and callable up via the Internet.

11 Claims, 4 Drawing Sheets

U.S. PATENT DOCUMENTS

| | | | |
|---|---|---|---|
| 7,814,478 B2 * | 10/2010 | Friedman | 717/173 |
| 7,865,907 B2 * | 1/2011 | Opheim | 719/321 |
| 7,890,212 B2 * | 2/2011 | Cornett et al. | 700/264 |
| 7,908,020 B2 * | 3/2011 | Pieronek | 700/19 |
| 7,937,078 B2 * | 5/2011 | Okita et al. | 455/418 |
| 2004/0083456 A1 | 4/2004 | Cornett et al. | |
| 2006/0259500 A1 | 11/2006 | Hood et al. | |
| 2007/0056942 A1 * | 3/2007 | Daniel et al. | 219/125.1 |
| 2008/0082681 A1 * | 4/2008 | Leseberg et al. | 709/232 |

\* cited by examiner

| Script | Example | Documentation |
|---|---|---|

Documentation: MTX NC Programming instruction    Coordinate selection program

IW Engineering / IndraLogic: Insert hand wheel component

| Script | Example | Instruction |
|---|---|---|

Example:    Hand wheel functional component "PRG_HandWm.EXP"
Instruction: component    Description of hand wheel functional IW-Engineering / Configuration: Edit parameter
- AccAxJog "Jogged acceleration" (1010 00002)
- IncrPerRev "Number of increments/revolution" (9060 00001)
- WcsJoglt "NC-controlled axle" (7050 01010)
- IncrWcsJog "Weighting of an inched increment" (7050 01020)
- DistWcsJog "Variable inching distance" (7050 01030)
- DefStepAxVel "Jogging speed-defined steps" (1005 00007)
- VarDistAxVel "Jogging speed-variable steps" (1005 00008)
- TrafoProgName "Program name for the standard configuration" (7050 01100)
- CoordProgName "Program name for the coordinate selection" (7050 01110)

| Figure | Script | Instruction | Documentation |
|---|---|---|---|

Figure:    Overview of parameters to be viewed
Instruction:    Edit machine parameters
Documentation: MTX Parameter description    Hand wheel in WCS IW Operation / IndraLogic: Select operating mode
- Select the channel operating mode "Manually set up work piece coordinates" via the interface signals qCH_OpModeSel_00...qCH_OpModeSel_03.

| Script | Example | Instruction | Documentation |
|---|---|---|---|

Fig. 3

METHOD FOR PROGRAMMING A CONTROL DEVICE

CROSS-REFERENCE TO RELATED APPLICATION

The invention described and claimed hereinbelow is also described in German Patent Application DE 10 2008 007 102.1 filed on Feb. 1, 2008. This German Patent Application, whose subject matter is incorporated here by reference, provides the basis for a claim of priority of invention under 35 U.S.C. 119(a)-(d).

BACKGROUND OF THE INVENTION

The present invention relates to a method for programming a control device. This control device is used, in particular, in machine tools, printing presses, processing machines, and the like.

When machine tools of this type are started up, it is typically necessary to program their control devices in an application-specific manner (in accordance with the particular requirements). From the prior art, it is known to load the components required for this programming from libraries stored on highly diverse types of storage media, and from a server via the Internet. The particular components are then imported into the library of an engineering environment, e.g. via a temporary memory. There, they are integrated in the existing engineering project and are transferred to the control. The integration of an additional functionality or additional components into an existing project requires several operating steps, a great deal of time, and must be carried out by the user in a specific sequence. In addition, the mechanisms and basic conditions of the engineering environment and the control must be taken into account. For example, the operating steps required to open a program editor in the engineering environment, or e.g. activating modified machine parameters within the control system.

To integrate the components, a high level of control-specific expertise is required, and the user must be familiar with the required tools (e.g. PLC program editor or NC machine parameter input) in order to incorporate the components into the control quickly. In addition, the specific basic conditions for the particular machine tool must be known (e.g. maximum displacement range of the axles). The problem often exists, however, that the available documentation and handling instructions are not up to date.

SUMMARY OF THE INVENTION

The object of the present invention, therefore, is to provide a method that simplifies the integration of components into a control.

In a method—according to the present invention—for programming a control device for a machine, components required to program the control device are obtained in a first step, each component being called up from a data collection. In a further method step, the component is stored in a memory device, and it is processed in a further method step. Finally, the processed component is stored in the control device.

According to the present invention, the component is called up from a data collection via the Internet, and instructions that are characteristic for the components and for processing the components are output (preferably to a user), it being possible to also call up these instructions preferably via the Internet.

In the case of the prior art, users must therefore know the system configuration very exactly and, in order to operate in a time-efficient manner, they must have an exact overview of the engineering environment and the control system. In the method according to the present invention, however, a working instruction is preferably output to the user using the component. This working instruction (also referred to below as a handling instruction) contains the detailed steps that the user must carry out in order to successfully integrate the particular components in the project of the engineering environment or in the control device. The present invention therefore simplifies the start-up of control systems in particular, because, according to the present invention, an automated integration of components in the control is attained. More specifically, the handling steps required to integrate the components are preferably carried out using suitable auxiliary means, such as Internet technology or scripts in particular, and an automation interface on the control side. In this manner, it is also possible for an operator who does not have the special control-specific expertise to easily integrate a particular component in a control device by referring to the instructions. This increases the overall ease of handling of a control device, since the user easily obtains—via the Internet—the particular component itself and instructions for integrating it in the control.

In a preferred method, the instructions are output as step-by-step instructions. Therefore, a user, in particular, is informed in a step-by-step manner as to which step must be carried out next when the component is integrated in the control device. In addition, information is preferably output via steps that have already been carried out. Steps that have already been carried out are preferably recorded in these step-by-step instructions.

Utility programs that are suitable for processing the components are preferably provided to the user. These utility programs may be, e.g. plug-ins, libraries, or scripts that carry out a processing of the components.

In a further preferred method, at least one component converts a manual input made by a user into at least one control command for the machine, A component of this type is, e.g. a "hand wheel" which subsequently assigns a related control command for the machine control to an input from the machine operator into the machine. For example, by rotating the hand wheel mounted on the machine, an axle (which may be selected by the operator) is positioned within the machine with μm accuracy.

Preferably, at least one instruction is provided for each component. This means that, for each component, it is possible to integrate the component based on an instruction that has been tailored to the component.

In a further preferred method, at least one instruction contains a link to at least one utility program. Links therefore exist, e.g. between line-type instructions and the particular utility programs that may be used to execute or call up the instructions.

In a further preferred method, the processed component is automatically integrated in the control device. This means that a utility program is provided that carries out—at least semi-automatically—those steps that the user would otherwise follow to integrate the particular utility programs or components in the control. In this case, the individual instructions are preferably carried out automatically. As an option, a wizard (set-up assistant) may be used that enables the user to implement application-specific variations. In the case of integrating hand wheel components, this could be, e.g. the specification of the maximum speed for an active hand wheel.

In a further preferred method, the instructions are provided via a further data base.

This may be a further data base that is accessible via the Internet, or the data base may be provided on a data storage device such as a hard drive or a CD-ROM, or an intranet or the like.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows an excerpt of a handling instruction, in HTML format; and

DESCRIPTION OF THE PREFERRED EMBODIMENT

Figure 1:
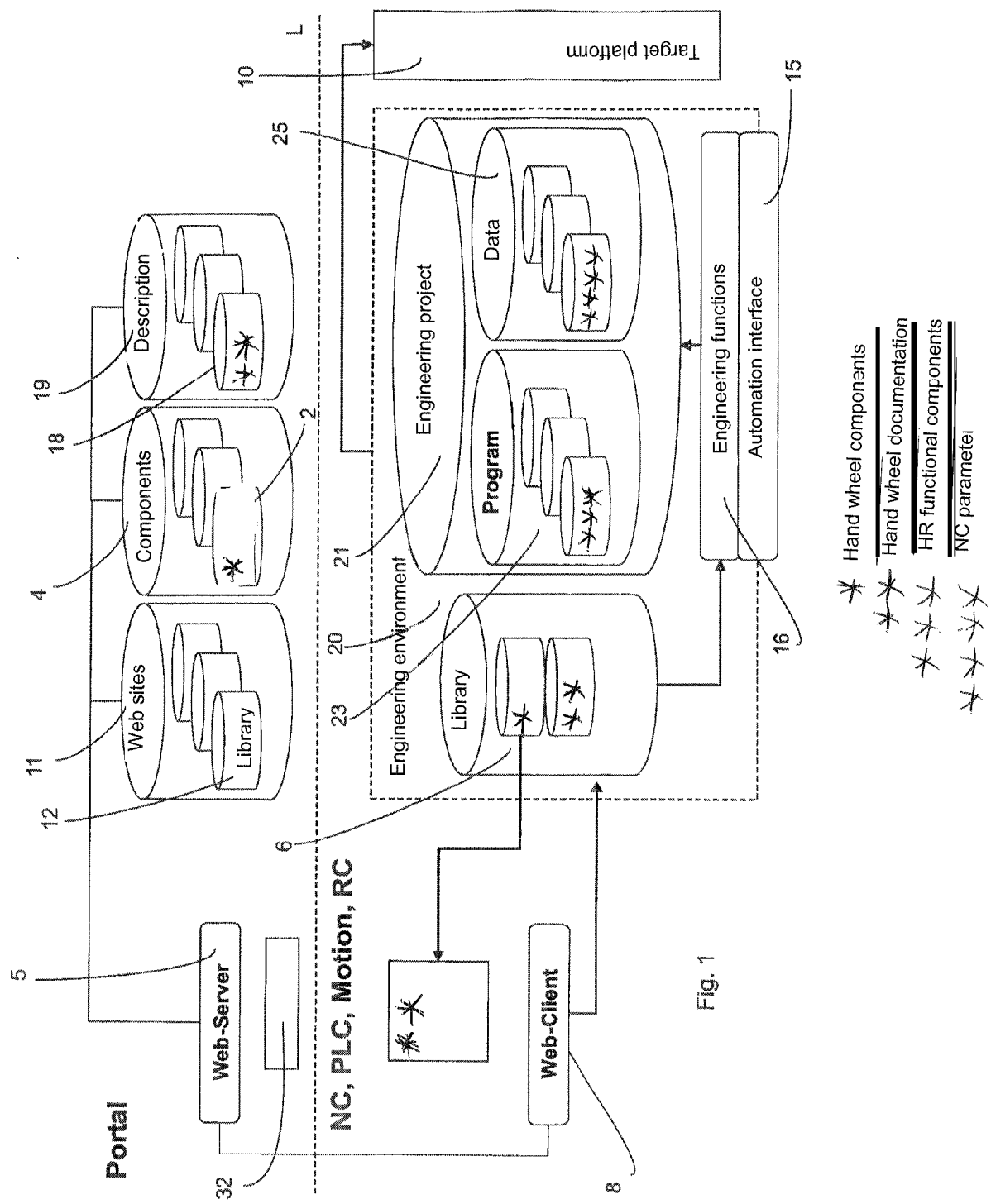
FIG. 1 shows a block diagram that illustrates the prior art.

FIG. 1 (current related art) shows a block diagram that illustrates the principles on which the current related art is based. A user may call up the web sites of a portal using a standard web browser and navigate to the desired components, e.g. a hand wheel component, and store it (in order to implement it in an existing control project) in a temporary memory, and, from there, to import it into the library of an engineering environment. In a different solution, the required components are stored directly in library 6 of engineering environment 20. After library 6 of engineering environment 20 is filled, the user may integrate the particular components—with consideration for the existing mechanisms and basic conditions of the engineering environment and the application-specific requirements (e.g. the maximum acceleration, speed, or displacement of an axle)—in the existing project, and, after integration has been performed successfully, transfer them to the target platform in order to continue the machine start-up.

Figure 4:
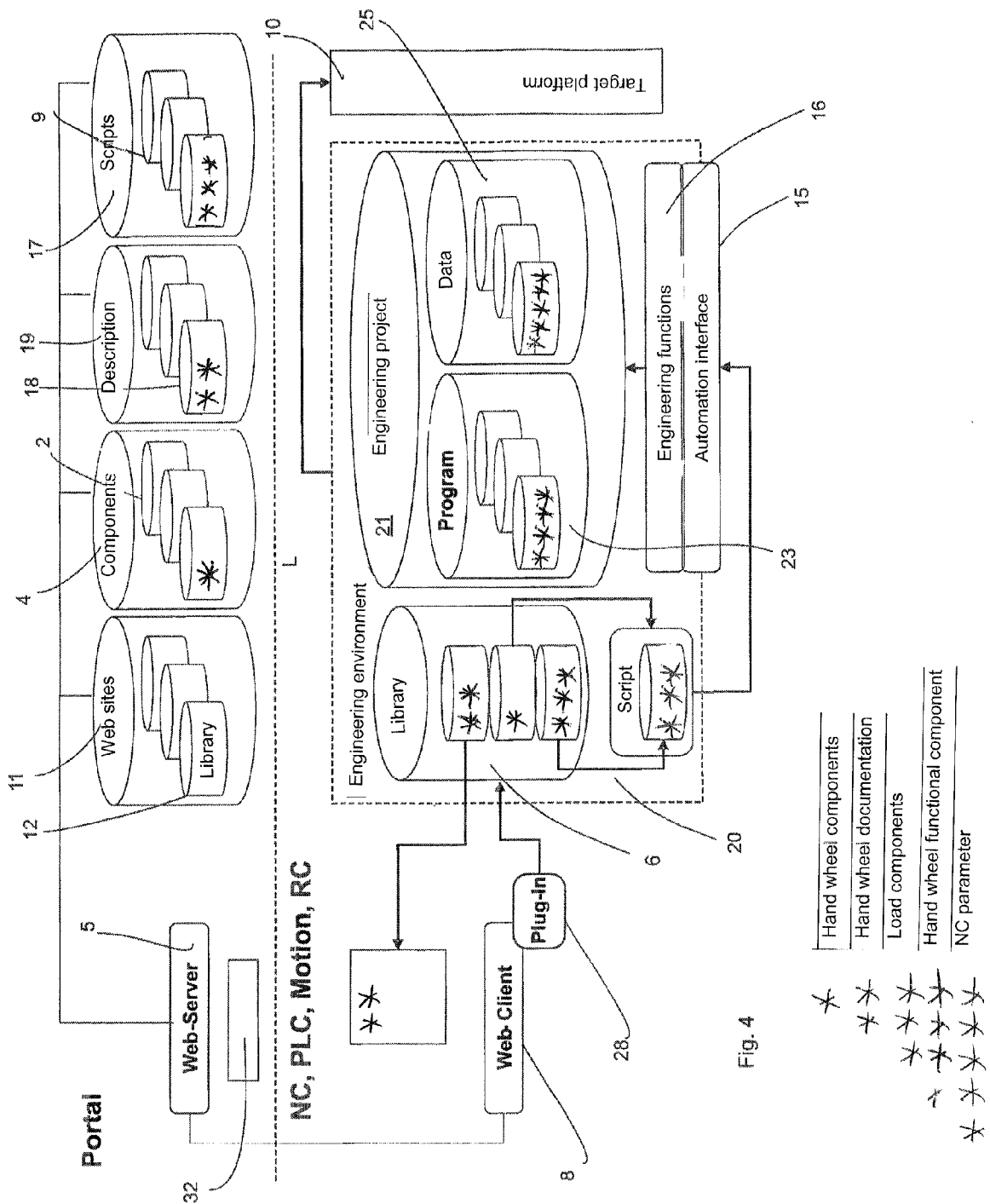
FIG. 4 shows a further block diagram that illustrates the present invention [components (and scripts) are loaded automatically via the Internet into the library (of the engineering environment]; scripts automatically implement handling steps.)

In FIGS. 1, 3, and 4, "HR-Komp." refers to hand wheel components, "HR-Doku" refers to the hand wheel documentation—which, in particular, may be start-up handling instructions for the particular component—, "HR-FB" refers to a hand wheel functional component (or a PLC functional component), and "NC-Par." refers to NC parameters. Using the NC parameters provided, NC-specific parameters such as maximum axle displacement, maximum axle speed, or maximum axle acceleration are also provided.

The components (programs and data) are loaded via the Internet into a memory device 6, i.e. a library 6. In this embodiment, memory device 6 is located in engineering environment 20 of the project to be created and which will be ultimately loaded in a control device 10. Reference numeral 11 refers to web sites from which components 12—i.e. components from a library 12 in this case—may be downloaded. Similarly, individual components 2 may be downloaded from data collections 4 of components 2 via the Internet using a network server 5. Solid horizontal line L represents the separation between the Internet region and the region of user application. A user 8 first selects certain components 2 in a library 12 and loads them in the memory device or library 6 of engineering environment 20 which may already be located on control 10. Components 2 are stored in memory device 6, at least for the interim.

The components are then loaded into control project 21 using specified functions 16. A large number of programs 23 and data 25 is also stored in control project 21. Data 25 may be, e.g. parameter records for the control.

Once all of the handling steps have been carried out, particular components 2, data and programs of components 2 are integrated in control environment 21, and they may then be transferred to the target platform or control 10 (in the form of a soft control or specific hardware). In the example shown in FIG. 1, component 2 may be a hand wheel 2, i.e. a component 2 that establishes a connection between actuating elements of a machine and associated control processes.

Standard web browsers 13 may be used to download individual components 2 from the Internet. The particular accesses are preferably password-protected, to ensure that only certain users may download particular components 2 for their control devices.

Figure 2:
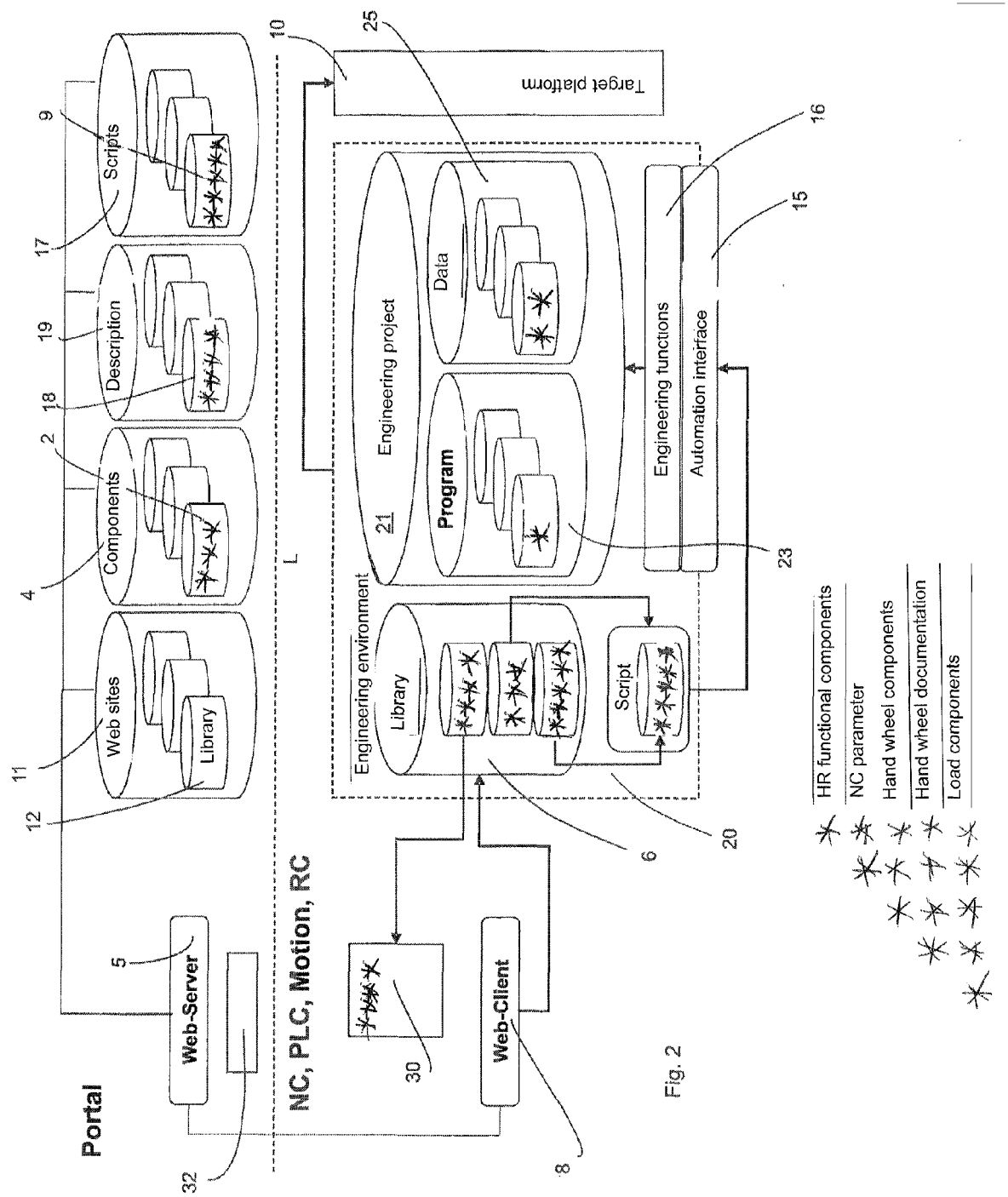
FIG. 2 shows a block diagram that illustrates the present invention [components (and scripts) are loaded manually via the Internet into the library (of the engineering environment]; scripts automatically implement individual handling steps;)

FIG. 2 shows an illustration of a preferred method.

In this case, the user may also use a standard web browser to call up web sites 11 of a portal and navigate to desired components 2, e.g. a hand wheel component 2. In contrast to FIG. 1, handling instructions 30 (a special form of documentation in which the individual steps to be carried out are described in detail, in a step-by-step manner) and scripts 9 (preferably in a data collection 17) for the individual components and subcomponents are also made available in this case. Optionally, further information, such as programs, graphics, videos, etc., may also be provided for the individual components and their subcomponents. After a component 2, 12 has been selected, all of its data may be transferred to a temporary memory in the same manner, as described above, and, from there, imported into library 6 of an engineering environment 20 or stored directly in library 6 of engineering environment 20.

After library 6 of engineering environment 20 is filled, the user may easily (without having deeper knowledge of the engineering environment or the control system) integrate the particular components manually in existing project 21 (programs 23 and data 25) as described in the specified handling instructions, and with consideration for the existing requirements, and, after integration has been performed successfully, transfer them to target platform 10 in order to continue the machine start-up.

As an alternative, it is also possible—by using the links to scripts 9 which are integrated in handling instructions 30—to start scripts 9 and therefore carry out the individual working steps automatically. It is also possible to use a wizard to enable the user to make application-specific inputs, e.g. the evaluation of an increment for a hand wheel functional component.

In addition to the method shown in FIG. 1, in this case, components 2 and scripts 9 are downloaded via the Internet to the library or memory device 6 of engineering environment 20. Scripts 9, which may also be called up via a platform 17, automatically implement the handling steps of handling instruction 30. This is illustrated in the lower part of FIG. 2, in which it is shown that user 8 accesses individual scripts 9 and, conversely, scripts 9 are loaded in an automation module 15, Reference numeral 30 refers, schematically, to a handling instruction for storing individual components 2. Based on handling instruction 30, user 8 carries out the steps required to integrate components 2, preferably in order. Basic conditions, for instance, for individual components 2 may also be indicated in this step. Basic conditions of this type may result from the subsequent use of the components or the use of the machine in its entirety.

In this method as well, a component 2 and all of its subcomponents are first downloaded to library 6 of engineering environment 20. It would also be possible for the entire component library to have already been filled in the engineering environment, and for it to be updated via the Internet only as needed. In this embodiment and in the embodiment described above, library 6 may also be located outside of engineering environment 20. In this case as well, scripts 9 are downloaded from the Internet. It would also be possible for the particular scripts to have been preinstalled in assigned folders in the control, and for them to be updated via the Internet only as needed.

In the sequence depicted in FIG. 2, user 8 carries out the necessary steps manually and in order. It is also possible in this case, however, for the user to start scripts 9—which have already been stored in certain folders—using links which have preferably been stored in the individual handling steps of instructions 30.

FIG. 3 shows, e.g. an excerpt of a handling instruction for the start-up of a hand wheel on a machine tool. (Using a hand wheel component of this type, the individual axles of a machine tool may be moved with μm accuracy by rotating the hand wheel.)

A brief description 19 of the start-up part (see FIGS. 1, 2, and 4) involved is provided at the beginning of a handling instruction of this type. For each step to be carried out, the next step is to answer the questions "Where am I supposed to function within the engineering environment?", and "What is carried out in this working step?". The working steps "Insert the hand wheel functional component", and "Edit parameter" will be described here as examples. The first header prompts the user to open the PLC program editor in the engineering environment and to integrate the hand wheel component. Users who have not yet integrated a PLC functional component in an existing PLC program may view the handling instruction for integrating a PLC functional component via the "Instruction" link, and to carry out the individual start-up steps in the manner described. Under the link "Example", the user may also view an integration of a PLC component as an example, e.g. in the form of a brief video. Using the "Script" link, the user is also provided with a largely automated integration of the PLC functional component. In this case, the script prompts the user to provide a few application-specific inputs (in the form of a wizard), e.g. in which part of the program the functional component should be integrated, on which NC axle the component should act, or, e.g. the evaluation of increments specified via the hand wheel relative to the motion or speed to be carried out.

The second header, "IW Engineering/Configuration" prompts the user to open the machine parameter editor in the engineering environment, and to edit the parameters listed below to start up a hand wheel. Using the parameter "Jogged acceleration" (parameter ID. AccAxJog; parameter number: 1010 00002), for instance, the acceleration behavior of the particular axles must be defined in the inching mode using the hand wheel. The user has access to the links "Figure" to display an image, "Instruction" to display the individual working steps, "Documentation" to display the parameter description, and, in particular, "Script". The "Script" link takes the user to the relevant parameters within the parameter editor. Another alternative would be for the script to display a wizard that queries the required parameter values and transfers them to the parameter data base.

FIG. 4 shows a further automated variant to illustrate the method according to the present invention. Components 2 (and scripts 9) are loaded via the Internet to library 6 (of engineering environment 20), and scripts 9 automatically implement handling steps.

In the same manner as illustrated in FIG. 2, the user may call up the web sites of a portal using a standard web browser and navigate to the desired components. Using a plug-in 28 (a program which may be called up), in web client 8, when a component is selected, all of the data, programs, scripts, and documents, graphics, videos, handling instructions, etc. that belong to the components (and the subcomponents) are loaded into library 6 of engineering environment 20. As an option, plug-in 28 could also check to determine if the selected component and its subcomponents are already present in the library of the engineering environment, or if all of the data, programs, and scripts—and, possibly, their documents, graphics, and videos, handling instructions, etc.—required to integrate the components are already present in the library, and, if necessary, to subsequently download only the data that is missing. It would also be feasible for the scripts and all remaining data and information to have already been stored in the library of the engineering environment, and to only look for a more current version.

After the required components are downloaded to library 6 of engineering environment 20, plug-in 28 or the user in engineering environment 20 starts script 9 associated with the component. Script 9 starts the scripts assigned to the associated subcomponents which, in turn, start the scripts of the individual handling steps (in the same order as described in the handling instructions (see FIG. 3)). A mixed operation is also feasible, in which the user carries out some handling steps individually, and others using a script.

The scripts integrate the data and program parts provided in the engineering project by using automation interface 15 (and engineering functions 16) of engineering environment 20.

Once all of the scripts have been carried out, data 25 and programs 23 of the components are integrated in the engineering environment, and they may be transferred to target platform 10 (soft control, specific hardware), also in a script-controlled manner. The integration of components may be controlled by the user (in the same manner as described in FIG. 2) as needed using wizards.

In this case as well, libraries are downloaded from the Internet via Internet sites 11, individual components 2 are downloaded from data collections 4, and individual scripts 9 are downloaded from script data collections 17 with the aid of network services 32. Hand wheel documentation 18 is also downloaded in this case. The first step in this case as well is to select a component 2. Next, a module 28, such as a plug-in in web browser 13 of user 8, is started. Plug-in 28 loads selected component 2 and required scripts 9 in the engineering environment.

It is also possible to integrate simple components in an existing object, e.g. a PLC functional component. It is also feasible to integrate programs and data in the sense of a component outside of engineering environment 20 in the same manner.

In addition, utility programs (also referred to as wizards) may be provided in order to inform the user of the status of the particular working step that was carried out. If necessary, the user may be able to make inputs, thereby preventing the user from making the necessary changes in the specific menus of engineering environment 20 (e.g. in the NC parameter editor or the PLC programming environment), i.e. instead of a change being made directly in the engineering environment, the user is prompted to make these changes as described in the handling instructions.

All features disclosed in the application documents are claimed as being essential to the present invention, provided they are novel compared with the related art, either individually or in combination.

It will be understood that each of the elements described above, or two or more together, may also find a useful application in other types of methods and constructions differing from the types described above.

While the invention has been illustrated and described as embodied in a method for programming a control device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for automated programming of a control device for a machine, comprising the steps of:
   obtaining a component that is required to program the control device, wherein said component is called up from a data collection;
   storing the component in a memory device;
   processing the component;
   integrating the processed component in the control device;
   calling up the component from a data collection via an Internet;
   outputting working instructions specific for the component to a user, wherein said working instructions comprise a series of method steps for integrating the component in the control device by the user, and wherein said working instructions are adapted to be called up via the Internet;
   carrying out said series of method steps of said working instructions for integration of the component by using auxiliary means selected from the group consisting of Internet technology, scripts, and an automation interface;
   providing at least one instruction for each component, said at least one instruction being tailored to the component; and
   providing information selected form the group consisting of programs, graphics, and videos with the individual components.

2. The method as defined in claim 1, wherein said outputting the instructions includes outputting the instructions as step-by-step instructions.

3. The method according to claim 2, further comprising recording steps that have already been carried out in the step-by-step instructions.

4. The method as defined in claim 1, further comprising making utility programs that are suitable for processing the component available to a user.

5. The method as defined in claim 1, further comprising converting by the component a manual entry made by a user into at least one control command for the machine.

6. The method as defined in claim 1, further comprising including in at least one instruction a link to at least one utility program.

7. The method as defined in claim 1, further comprising integrating the processed component in the control device automatically.

8. The method as defined in claim 1, further comprising providing the instructions via a further data base.

9. The method according to claim 1, further comprising protecting the accesses to download the components from the internet to ensure that only selected users may download particular components for a control device of said users.

10. The method according to claim 1, further comprising using a wizard to enable the user to make application-specific inputs.

11. The method according to claim 1, further comprising providing a script link that takes the users to relevant parameters.

* * * * *